May 25, 1943.  W. R. KETCHUM  2,319,994
PROCESS FOR REFINING AND PRESERVING CITRUS FRUIT JUICES
Filed May 7, 1940  2 Sheets-Sheet 1
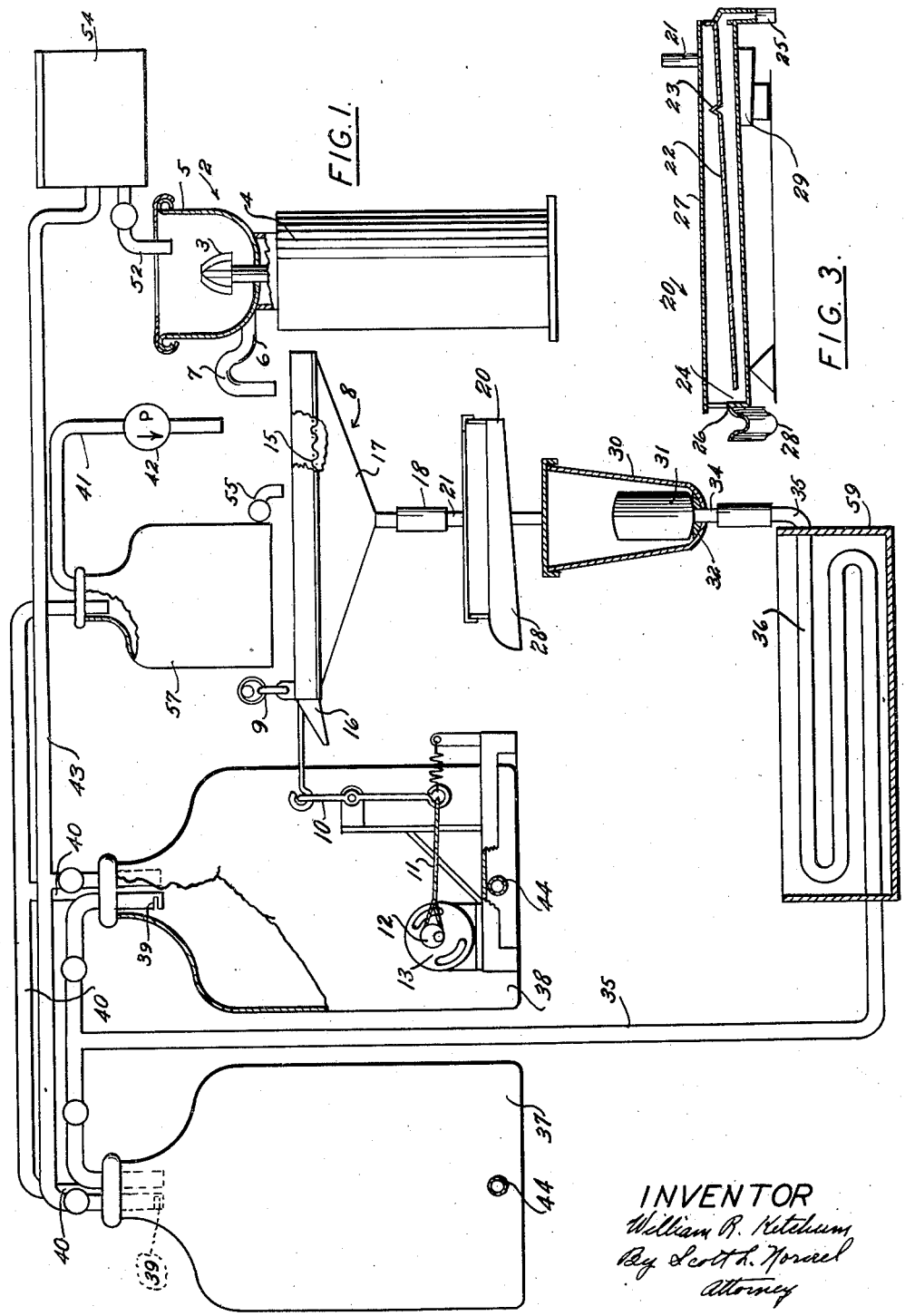
INVENTOR
William R. Ketchum
By Scott L. Norvell
Attorney

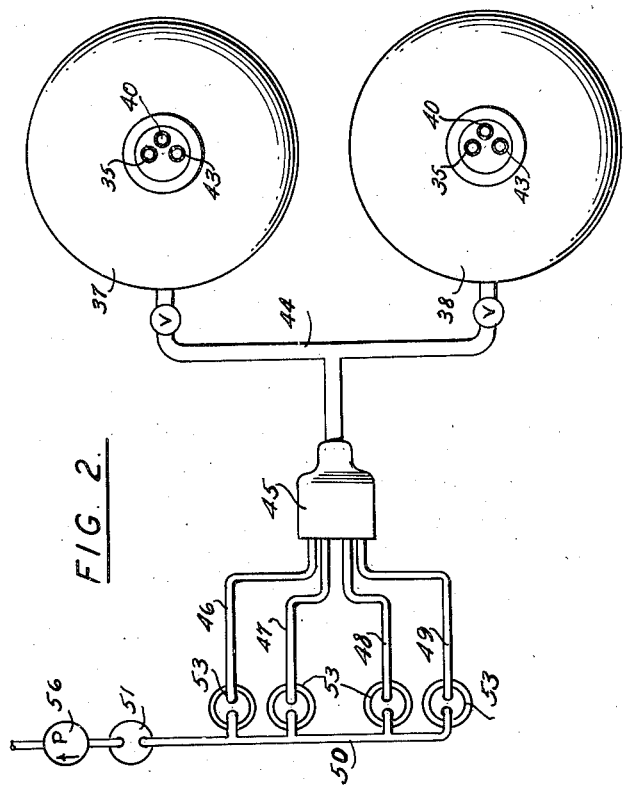

Patented May 25, 1943

2,319,994

UNITED STATES PATENT OFFICE 2,319,994

PROCESS FOR REFINING AND PRESERVING CITRUS FRUIT JUICES

William R. Ketchum, Phoenix, Ariz.

Application May 7, 1940, Serial No. 333,706

5 Claims. (Cl. 99—155)

This invention concerns process and apparatus incidental thereto for refining and preserving citrus fruit juices.

Throughout the industry of producing and marketing citrus fruit juices, various methods and devices for preserving the juice have appeared from time to time. The object sought in all methods and resultant products is to produce a juice which maintains a fresh and palatable taste for a time sufficient to distribute and market it. It is well known that fresh citrus juice, extracted in the usual manner and packed in ordinary containers, loses its fresh taste in a very short time. While various methods and means have been devised for preserving these juices so that they might be distributed in bottles or containers, all of these methods involve processing such that the natural flavor of the juice is altered or changed and the fresh taste destroyed. Briefly, methods heretofore used, consist of attempts to preserve the juice by means of a preservative such as benzoate of soda, or by means of canning in sealed containers and heating the container sufficiently to destroy all bacterial growths. On the other hand, attempts have been made to preserve the citrus juice flavor by mixing given quantities of the juice with oil extracted from the rind to secure flavor and thereafter adding sugar, citric acid and water. All these processes, however, have the common objection that the natural flavor of the juice is destroyed or altered and that the resultant product is not as desirable or healthful as the natural fruit juice.

By the process hereinafter described, I have devised a method whereby freshly extracted citrus fruit juices are treated so that the flavor is preserved, without the addition of any preservative or foreign substance and so that the juice may be kept in marketable containers such as bottles, flasks, or the like, for a considerable time.

I have found that the fresh flavor of the juice is destroyed primarily by oxidation of some of the ingredients of the juice and, second, by bacterial action. Some phases of the bacterial action require oxygen and, therefore, it is of primary importance to remove as much dissolved or occluded oxygen from the juice as possible and to remove it as quickly as possible after extraction. Further, I have found that these juices turn stale due to a decomposition, by bacterial action or otherwise, of the rind oils that are necessarily mixed with the juices at the time of extraction. My process, therefore, includes, first the extraction of the juice from the fruit so that the juice comes in contact with air as little as possible; second, removal of the rind oil from the juice as quickly as possible, third, chilling, and fourth, subjecting the juice to vacuum to remove dissolved gases, especially oxygen.

The objects of my invention, therefore, are—

First, to provide a process whereby juice may be extracted from the fruit to contain a minimum of bacteria and other substances likely to cause rapid deterioration of the juice;

Second, to provide a method and apparatus for removing from the juice substances likely to enhance deterioration;

Third, the process, including steps necessary for handling the juice after extraction, whereby it is directed into containers without contact with substances likely to cause rapid deterioration by spoiling;

A fourth object includes the process of extracting juice from the fruit in the presence of an inert gas such as carbon dioxide; second, the rapid screening of the juice and removal of seeds and pulp therefrom with minimum of agitation and contact with air; third, the removing of undesirable oils from the juice; fourth, rapid chilling; fifth, the subjecting of the juice to vacuum to remove occluded gases therefrom, and sixth, the filling of commercial containers with the juice without contact with the air.

Other objects will appear hereinafter.

I attain the foregoing objects by means of the processes hereinafter described and by means of apparatus as illustrated in the accompanying drawings in which—

Figure 1 is a semi-diagrammatic view of a plant for handling juice according to my improved methods up to the point of filling containers;

Figure 2 is a plan view of a continuation of the diagrammatic layout in Figure 1, including apparatus for filling containers; and Figure 3 is a side elevational section of the oil skimmer.

Similar numerals refer to similar parts in all views.

Referring to the diagram, Figure 1, 2 represents a juice extractor consisting of burring machine having a burr 3, operating on a vertical shaft driven by a motor within case support 4 and operating within a bowl 5. The rim of this bowl is covered with a diaphragm 6 of rubber or other suitable material, having a centrally positioned opening for insertion of fruit halves and removal of the rind hull. Juice extracted falls to the bottom of bowl 5 and is drawn off through the tubular spout 6, which has a gooseneck trap 7. The spout deposits the juice on a shaking screen separator 8 suspended near its outer end on rings and links 9 and given principally a longitudinal shaking motion by the shake bar 10 coupled by a cord 11 to an eccentric 12 on the shaft of a motor 13. This shaking motion includes a secondary vertical motion and is such that the pulp, rag and seeds move to the left, toward the outer end of screen 15, which may be given an upward slant, from the point where the juice is deposited. Pulp and seeds are dropped from spout 16 at the outer end. Details of this apparatus are fully explained in my co-pending apparatus application, but further detail is deemed unnecessary here as a part of the process. Juice, having passed through screen 15, drops through the funnel shaped lower portion 17 of separator 8, through flexible tube 18 and into the rind oil skimmer 20.

The rapid to and fro horizontal motion of the screen 15 tends to break up any pulp-like fruit cells not fully demolished by the burr, and the up and down component of its motion tends to keep their pulp from matting on the screen and clogging it. The cord 11 used as a medium for transmitting the horizontal motion from eccentric 12 gives a quicker or sharper motion from left to right than vice versa. This tends to move the pulp seeds and the like to the left and out of the left end of the screen into the spout 16.

After screening, the juice is found to be covered with a froth composed of bubbles having a film texture partially including rind oil. A skimmer 20 consists of a flow plate 22 having a cross baffle or weir 23 to uniformly distribute the flow of juice over its entire width. At the lower end of the flow plate there is a trap 24 which permits the main body of the juice to return under the flow plate and on the bottom of the skimmer body to a spout 25. A skimming weir 26 is provided on the outer edge of the trap 24 of predetermined height so that the froth gathered on the top of the juice as it flows over flow plate wil be discharged over its edge and collected in a trough 28. The top of the skimmer body is closed by a cover 27. Juice enters the skimmer through tube 21, flows over flow plate 22, descends through trap 24 and flows through the lower portion of the body to be discharged through tube 25. Depth of skimming is regulated by tilting the body of the skimmer by means of angular supporting blocks 29.

From the discharge spout 25, juice is dropped into an automatic flow control. This apparatus consists of a funnel shaped container 30 provided with a float 31 having a rounded lower end adapted to fit into valve seat 32 which controls the out flow. The sides of the body of this float control are sufficiently deep so that it will hold an appreciable quantity of juice. The buoyancy of the float is made so that when the body of the float control is approximately two-thirds full, the float will raise, permitting liquid to drain through the discharge pipe 34. This discharge pipe is connected through a tube 35 to cooling coils 36. These are refrigerated in vat 5? sufficiently to chill the juice to a temperature between 40 and 32 degrees Fahrenheit.

From the cooling coils juice is led to either of two large glass carboys, 37 and 38. Each carboy is provided with a gas tight covering or cork having holes to provide entrance for three tubes or pipes. The fresh juice tube 35 is divided into two arms and each of these terminates near the top of the body of each carboy. The ends of these tubes are plugged and a slot 39 is positioned so that juice will be discharged and directed on the inner walls of the carboys to secure rapid gas removal. A second pair of tubes 40 extend to practically the same level as the juice inlet tubes. These are joined and lead to the top of a trap bottle 57. A further tube 41 extends out of the trap bottle and connects to a vacuum pump 42. A third tube 43 is used to admit carbon dioxide and connects with an insulated box 54 containing carbon dioxide snow (dry ice). Each of these tubes is provided with a control valve near the mouth of the carboy.

At the bottom of each carboy a fourth tube 44 connects to a manifold filling head 45. Referring to Figure 2, the filling head is provided with four container filling tubes 46, 47, 48, and 49, leading to a group of four containers 53 to be filled. The tops of these containers are closed by a soft rubber gasket into which their juice delivery tubes are fitted. These extend into the necks of the container a short way; to the height it is desired to fill them. Vacuum tubes 50 are also inserted into these gasket covers to the same depth. These are led to a vacuum line, which extends through a spill over catch bottle 51 to a vacuum pump 56.

In operation, carbon dioxide gas is let into the burring bowl from the insulated box 54 through tube 52. As fruit halves are burred, this gas sludges around the sides of the bowl with the juice. A certain amount of juice is retained in the bowl by the gooseneck trap 7 and this prevents the escape of this gas except with the juice. Diaphragm 6 tends to retain gas thrown out to the sides of the bowl by centrifugal action. Fruit halves are fed to the burr by hand.

Leaving the bowl the burred juice pulp and rag (inner membranes of the fruit skin) drop onto the near (right hand) end of the screen separator 8. This operates, as above explained, and the juice immediately drops into the skimmer; thence into the juice float control. The float control operates to let quantities of juice intermittently into the juice tube 35 and thence through the cooling coils 36 into either of the processing carboys 37 or 38. Valves on the tubes entering these carboys are manipulated so that one is being filled with juice from tube 35 to be processed while the other is being emptied into containers.

In filling a carboy the valve leading to juice tube 35 is opened and the valve in its respective tube 40 is opened. Vacuum is drawn on the carboy through trap bottle 57. As juice enters this system, intermittently from the float control it is constantly subjected to vacuum which draws out practically all dissolved or occluded gases in the juice. These gases are principally carbon dioxide and air, which were absorbed when the fruit was cut and burred. As the carboy fills these gases appear as bubbles and form a froth on top of the juice. As the juice nears the top of the carboy this froth fills its entire upper portion. Vacuum processing is continued for approximately ten minutes or until forth stops forming. This froth is, for the most part, drawn over into trap bottle 57, from which it may be drained, after it has settled, through tap 55, and returned through separator 8 into the system for reprocessing.

After gases have been removed from juice in one of the carboys it is considered processed except for the last step; that is, removing it to containers without contact with air. This is done by closing valves in the tubes leading to the juice tube and vacuum tube, and opening the valve in tube 43 leading to box 54. Juice is then drawn from this carboy through its tube 44 into the containers 53 by vacuum as above explained. As the juice is removed from the carboy, carbon dioxide gas is drawn into the carboy through tube 43 and air is thus excluded. As the containers are filled vacuum is broken when the juice reaches the level of the tubes extending into the containers, the gasket covers are removed and the containers immediately capped or corked.

During burring, as above mentioned, the juice is necessarily agitated and centrifuged. This, however, is done in an atmosphere principally of carbon dioxide. Obviously, any other heavy, inert, soluble and non-poisonous gas may be used.

As the juice and pulp mixture is being screened this heavy gas hovers over the screen and the funnel below it; again in the skimmer this gas hovers over the fluid juice and beneath the skimmer cover. From this, gas is carried over in solution filling the funnel of the float control. In all these steps this gas is present and acts to exclude air. I have found that by excluding air from contact with freshly extracted juice, the oxidation and bacterial action which causes staling and spoiling is greatly retarded. This action is further retarded by a rapid chilling of the juice immediately after screening and skimming. Removal of the rind oil in the froth from the skimmer and again with the froth from the processing carboy, further retards staling and ageing actions in the juice. When these steps are followed by bottling in containers with a minimum contact with air, a processed juice is produced which may be stored a sufficient length of time to be distributed and marketed if kept below 40 degrees Fahrenheit. As a rule, staling, ageing, and spoiling takes place rapidly after a container has been opened. Particularly where air has entered while pouring juice from it. Therefore, I prefer small containers having comparatively wide mouths. Any type of cap or liquid tight cover may be used. It is not necessary that a vacuum be maintained in the container since I find that there is always a small amount of carbon dioxide gas remaining above the liquid sufficient to exclude air.

Having now explained my process, and the apparatus used to attain the various steps of the process, I wish to be limited only by the following claims:

1. The process of extracting and preserving citrus fruit juices consisting of removal of juice from the fruit in an atmosphere heavily charged with carbon dioxide so that an appreciable amount of this gas is dissolved in the juice immediately after extraction, immediate rapid screening with a minimum of agitation flowing the juice in a thin film and, skimming of oil bearing froth therefrom in an atmosphere charged with carbon dioxide, chilling the juice to a temperature between 40 degrees and 32 degrees Fahrenheit, while maintained under vacuum, and subjecting the juice to vacuum at said temperature until dissolved gases are drawn off and further removal of froth therefrom.

2. In the process of extracting and preserving fresh citrus juices, wherein the juices are extracted from the fruit in the presence of an inert gas and bottled under vacuum, the intermediate step, after extraction and before bottling, consisting of flowing the juice over a flat surface in a thin film so that dissolved gases are released forming a foam which collects the rind oil, and then separating the foam from the juice beneath it by continuous skimming.

3. In the process of extracting and preserving fresh citrus fruit juices wherein the juice is extracted, screened and bottled in the presence of an inert, soluble gas, the method of extracting rind oil after the juice has been extracted and screened, consisting of first, flowing the juice in a manner so that it forms a thin film causing dissolved gases to escape and form a froth carrying with it any mixed rind oil; second, separating the froth thus produced from the body of the juice by continuous skimming of the flowing juice.

4. In the process of extracting and preserving fresh citrus fruit juices wherein the juice is extracted and screened in the presence of an inert, soluble gas, the intermediate step, after extraction and before bottling, of removing the rind oil by first filming and flowing the juice over a flat surface whereby dissolved gases escape and form a froth which collects the principal part of any rind oil mixed with said juice, and second, removing said froth by skimming it from the flowing juice.

5. In the process of extracting citrus fruit juices, the method of extracting rind oil, including extracting juice in the presence of a soluble inert gas, slowly flowing the juice in a thin film, so that absorbed gases are released, forming a froth on top of said flowing film of juice and continuously skimming said froth from said juice.

WILLIAM R. KETCHUM.